United States Patent [19]

Frey

[11] Patent Number: 5,732,456
[45] Date of Patent: Mar. 31, 1998

[54] BRAKE SHOE SPRING INSTALLER AND METHOD OF USE

[76] Inventor: Donald Lamar Frey, 8402 Harris Ave., Parkville, Md. 21234

[21] Appl. No.: 741,716

[22] Filed: Oct. 31, 1996

[51] Int. Cl.⁶ .................... B23P 19/00; B23P 19/04
[52] U.S. Cl. .................... 29/426.6; 29/450; 29/227; 29/267
[58] Field of Search ................ 29/225, 227, 267, 29/426.6, 450; 254/10.5, 131; 81/176.1, 486

[56] References Cited

U.S. PATENT DOCUMENTS

| | | |
|---|---|---|
| 1,843,866 | 2/1932 | Chapman . |
| 1,889,167 | 11/1932 | Anderson ................... 29/227 |
| 2,042,287 | 5/1936 | Allievi et al. . |
| 2,811,772 | 11/1957 | Johnson . |
| 2,839,820 | 6/1958 | Bates . |
| 4,334,669 | 6/1982 | Ross ........................... 254/131 |
| 4,870,737 | 10/1989 | Navarro ...................... 29/227 |
| 5,003,680 | 4/1991 | Vesely et al. ................ 29/227 |
| 5,095,603 | 3/1992 | Carruthers et al. .......... 29/227 |
| 5,165,154 | 11/1992 | Miller ......................... 29/267 |
| 5,237,729 | 8/1993 | Martin ........................ 29/267 |
| 5,345,664 | 9/1994 | McMahon et al. .......... 29/426.6 |
| 5,507,083 | 4/1996 | Redgrave et al. ........... 29/227 |

FOREIGN PATENT DOCUMENTS

| | | | |
|---|---|---|---|
| 401147 | 8/1909 | France ........................ 29/227 |
| 57-6134 | 1/1982 | Japan .......................... 29/227 |
| 662232 | 5/1979 | U.S.S.R. ...................... 29/267 |

*Primary Examiner*—David P. Bryant
*Attorney, Agent, or Firm*—Leonard Bloom

[57] ABSTRACT

A tool and a method for installing and removing a spring for brake shoes on a large vehicle. A shaft has a handle angularly connected to a first end. A spike is mounted on the shaft, the spike being spaced apart and approximately parallel to the shaft. Preferably the shaft has two oppositely formed bends between the spike and the second end of the shaft. The spike engages the arcuate end of the spring and the shaft is leveraged to expand the spring to permit engagement and disengagement of the end of the spring with the brake shoe.

15 Claims, 4 Drawing Sheets

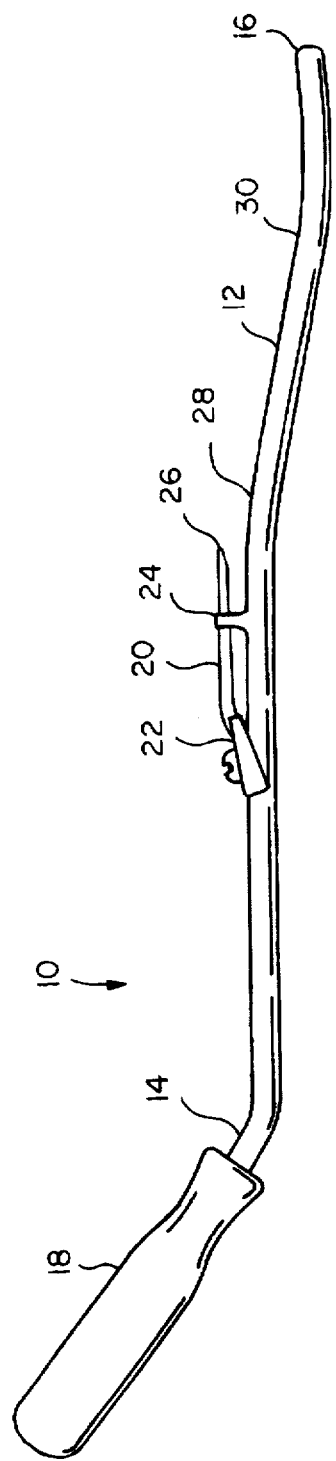
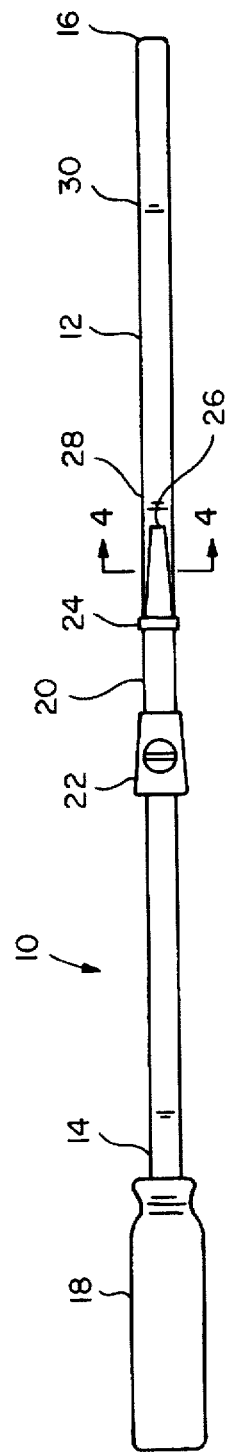
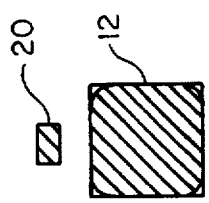
FIG. 2
FIG. 3
FIG. 4

BRAKE SHOE SPRING INSTALLER AND METHOD OF USE

BACKGROUND OF THE INVENTION

The present invention relates to a tool and a method to install and remove springs for brake shoes and more particularly to a simple tool which is used with brake shoes of trucks and large vehicles.

The upper and lower brake shoes of trucks and large vehicles are pivotally mounted on one end adjoining an adjustable cam and are connected by two sturdy springs at the opposite ends. In order to install or remove the pair of brake shoes, the springs must be expanded and connected (or disconnected) from the brake shoes. Since the springs are exposed to road dirt, moisture and high heat from the brakes, the springs are usually encrusted with layers of dirt and corrosion by-products. Furthermore, the brakes are mounted around the axle of the vehicle and are in a confined space, where it is difficult to work. In addition, there is a dust shield on the inner side of the brake shoes which severely restricts access to the inner spring. There is no special tool presently commercially available to remove or install the brake springs. The most common way for a mechanic to remove or install the brake springs is to grasp the spring with a plier-type tool in one hand and to move the brake shoe using a pry bar in the other hand to align the end of the spring with an opening in the brake shoe. This procedure is difficult and potentially dangerous in that the spring may be propelled at the mechanic or the mechanic's finger may be crushed between the spring and the brake shoe.

The applicant is aware of several U.S. patents which are directed to tools for use with brake springs. U.S. Pat. No. 1,843,866 to Chapman discloses a tool for installing brake springs, where the projected end of a member engages the hood end of the spring, and with proper manipulation, the spring is engaged in a notch and a dial pin for "hooking up" spring brake drums. However, the tool is for smaller vehicles with smaller springs. U.S. Pat. No. 2,042,287 to Allievi et al discloses a spring tool having a sharp prong that is utilized in removing or coupling the hooked end of a spring into a hole or opening. The handle of this device is in the center of the tool. The tool is used on smaller vehicles. U.S. Pat. No. 2,811,772 to Johnson discloses a tool having a bend therein and a bent lip at one end and a cylindrical body at the other end. U.S. Pat. No. 2,839,820 to Bates discloses a brake shoe spring tool which has a crank rotatable about a longitudinal axis. U.S. Pat. No. 4,870,737 to Navarro discloses a brake spring removal tool which has laterally extending spurs to engage the coiled portion of the spring. U.S. Pat. No. 5,003,680 to Vesely et al discloses a bar and at least one draw hook member pivoted thereon to swing through at least 90° with respect to the lever. U.S. Pat. No. 5,095,603 to Carruthers et al discloses a drum brake service tool which is a lever having a pair of spaced parallel arms at one end. The brake spring end is engaged between the arms on the lever and the lever is pivoted on the cam.

None of these tools have been accepted by mechanics servicing large vehicles and there is a need for a simple, rugged tool which can be used without training to safely remove and install springs on brake shoes.

BRIEF SUMMARY OF THE INVENTION

It is an object of the present invention to provide a simple tool which permits a user to rapidly remove and install springs on brake shoes for large vehicles without injury.

It is a further object of the present invention to provide a tool for removing and installing springs on brake shoes which is economical to produce and which can be used with minimum training.

In accordance with the teachings of the present invention there is provided a tool for installing and removing springs for brake shoes on an axle of a truck or large vehicle. The tool has a shaft having a first end and an opposite second end. A handle is angularly connected to the first end of the shaft. A spike is mounted on the shaft at approximately a midpoint thereof, the spike being spaced apart from, and approximately parallel to the shaft. The shaft, between the spike and the second end, has a first bend in a direction away from the spike and a second bend in a direction toward the spike. The spike engages an arcuate end of the spring. The second end of the shaft is leveraged against the axle to expand the spring such that the arcuate end of the spring may engage or disengage the brake shoe.

In another aspect, there is provided a method of using a tool for installing and removing a spring for brake shoes on an axle of a truck or large vehicle. A tool is provided having a shaft with a first end and a second end. A handle is connected to the first end. A spike is mounted on the shaft. The tool is placed adjacent to the brake shoe such that the spike is received in an arcuate end of the spring and the second end of the shaft is disposed under the axle. The handle is pressed downwardly to leverage the tool against the axle and expand the spring. The tool is moved toward the brake shoe to install the arcuate end of the spring or the tool is moved away from the brake shoe to remove the spring. The tool is moved away from the axle wherein the spike is removed from the spring and the end of the shaft is removed from the axle.

These and other objects of the present invention will become apparent from a reading of the following specification taken in conjunction with the enclosed drawings.

BRIEF DESCRIPTION OF THE DRAWINGS

FIG. 2 is a side elevation view of the tool of the present invention.

FIG. 3 is a top plan view of the tool of the present invention.

FIG. 4 is a cross-sectional view taken across the lines 4—4 of FIG. 3.

FIG. 16 is a side elevation view in partial cross section of an embodiment having a one piece spike mounted on the shaft.

DESCRIPTION

Figure 1:
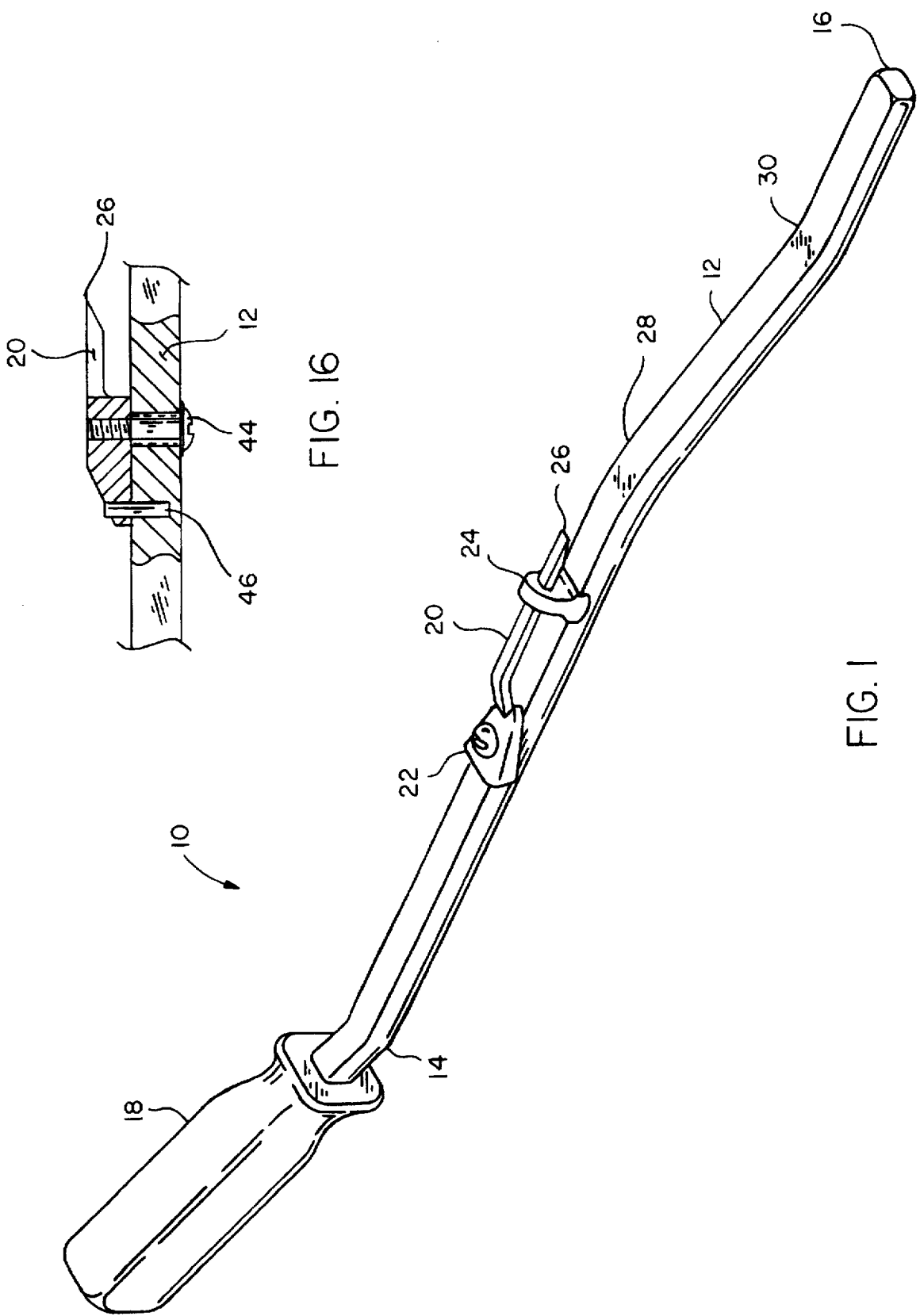
FIG. 1 is a perspective view of the tool of the present invention.

As shown in FIGS. 1–4 the tool 10 is a shaft 12, preferably square or rectangular in cross section, and preferably solid, not hollow. A shaft 12 having a ⅜ inch cross section has been found to be satisfactory. The shaft 12 has a first end 14 and an opposite second end 16, preferably about eighteen inches apart. The length is not critical but the shaft must be long enough to extend from the axle of a truck or large vehicle to beyond the outer edge of the brake shoe and must also have additional length to permit the user to apply leverage by manual pressure. On the first end 14 of the shaft 12, there is mounted a handle 18. It is further preferred that the first end 14 of the shaft 12 be formed at an angle of approximately 35° with respect to the body of the shaft in order to provide increased leverage and to provide a comfortable grip for the user, avoiding the brake shoes and other parts of the vehicle. In this manner, the handle 18 is angularly mounted with respect to the larger portion of the shaft 12.

At approximately the mid-point of the shaft 12, there is formed or connected, a spike 20. The spike 20 is spaced apart from the shaft 12 by approximately ⁷⁄₃₂ inch and is approximately parallel to the shaft 12. The spike 20 may be an integral part of the shaft, may be an adjunct welded thereto or otherwise connected.

As shown in FIG. 16, a one piece spike 20 is secured to the shaft 12 by a threaded screw 44. A retaining pin 46 is fitted in the shaft and extends into an opening in the spike 20 so that the spike 20 is prevented from moving laterally. Alternately, the spike 20 may be removable for replacement purposes. A second end of the spike 20 is removably secured to the shaft by a clip 22, screw, hasp or other means and the first end of the spike 20 is oriented away from the handle 18. If desired, a guide 24 formed on the shaft 12 to support the spike 20 a predetermined space above the shaft 12 may be used. The first end of the spike 20 projects outwardly from the guide 24 approximately one-half to one inch to permit engagement with a spring as will be described. The first end of the spike 20 is tapered (chamferred) 26 to provide a more narrow profile distal from the shaft 12 to assist in engagement with the spring. The spike 20 is approximately ¾ inch long from the tip to the base. It is preferred that the spike 20 has a hardness of Rockwell C40.

The shaft 12 further has a first bend 28 between the spike 20 and the second end 16 of the shaft. The first bend 28 is in a direction away from the spike 20 is approximately 10° in magnitude. It is preferred that the first bend 28 be formed approximately one inch from the spike 20. At approximately four to four and one-half inches from the first bend 28 and closer to the second end 16 of the shaft 12, a second bend 30 is formed in the shaft 12. The second bend 30 is approximately 10° in magnitude and is in a direction toward the spike 20. In this manner, the portion of the shaft 12 between the second bend 30 and the second end 16 of the shaft 12 is approximately parallel with the portion of the shaft 12 on which the spike 20 is mounted. The dimensions with respect to the angle of the bends and the distance from the spike 20 are not critical. The bends 28, 30 are provided to permit the shaft to avoid projecting parts of the brake shoes and other components of the vehicle.

Figure 5:
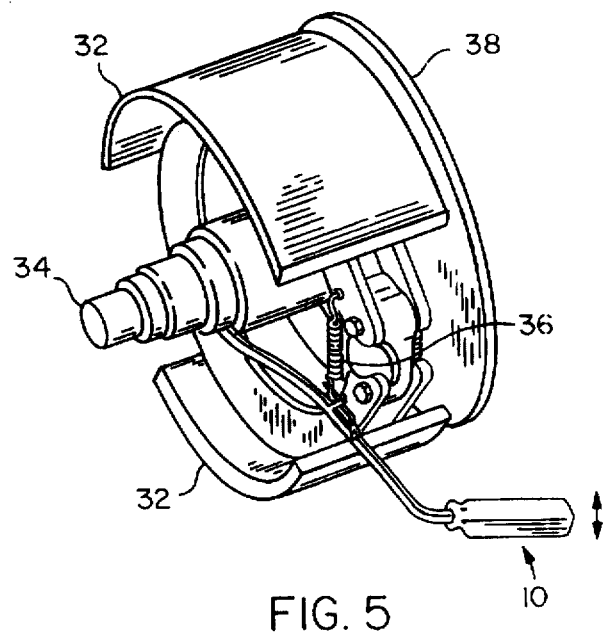
FIG. 5 is a perspective view showing the tool leveraged against the axle of a vehicle to install a brake spring on a side of the brake shoe.
Figure 6:
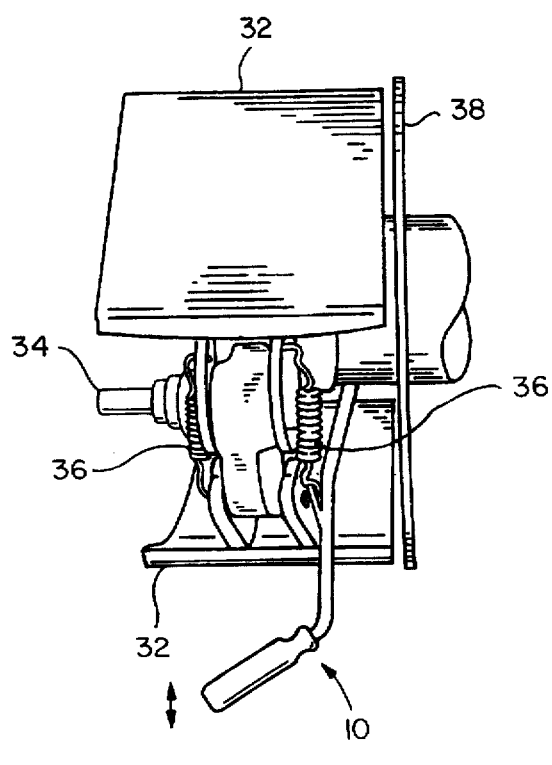
FIG. 6 is a perspective view showing the tool leveraged against the axle of a vehicle to install a brake spring on an opposite side of the brake shoe adjacent to the dust cover.
Figure 7:
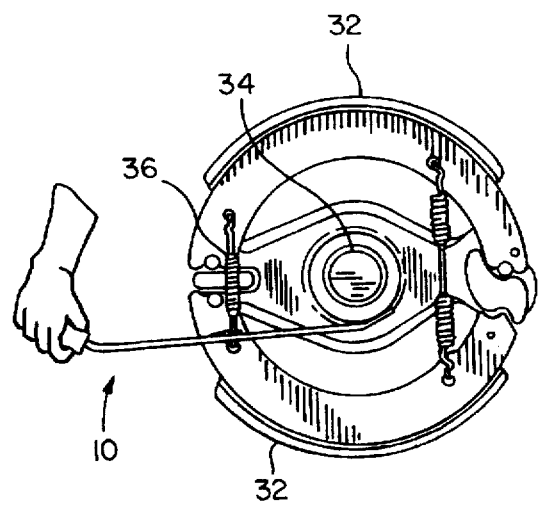
FIG. 7 is a side elevation view showing the tool leveraged against the axle of a vehicle to install a brake spring.
Figure 8:
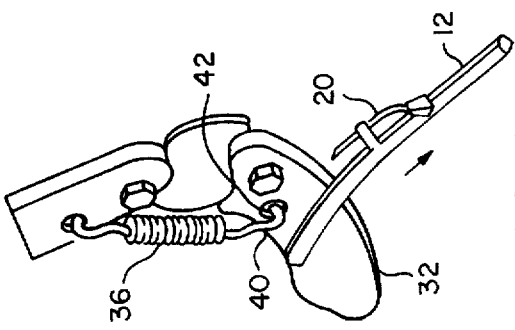
FIG. 8 is a perspective view showing the tool being moved toward the arcuate end on the spring to install the spring.
Figure 9:
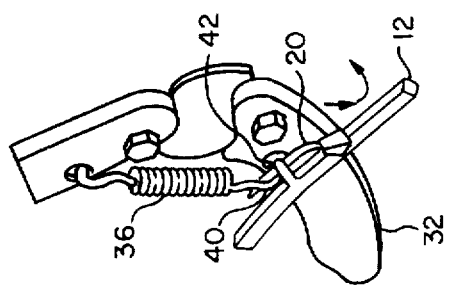
FIG. 9 is a perspective view showing the spike on the tool engaging the arcuate end on the spring.
Figure 10:
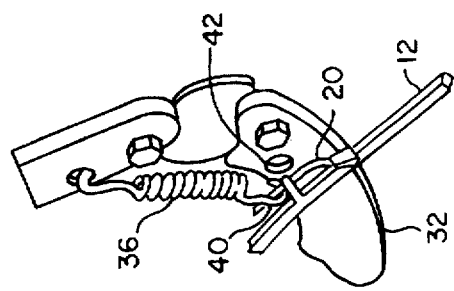
FIG. 10 is a perspective view showing the tool being leveraged downwardly to expand the spring and being moved toward the brake shoe to insert the end of the spring into an opening in the brake shoe.

The use of the tool 10 with a brake shoe 32 is shown in FIGS. 5–7. The second end 16 of the tool 10 is disposed between the brake shoes 32 so that the second end 16 is in contact with the axle 34. It is preferred that the second end 16 of the shaft 12 be square or rectangular, or at least have a flat surface to provide better contact with the axle. The tool 10 is oriented with the spike 20 opposed to a spring 36 which is suspended from the upper brake shoe 32. FIG. 6 shows the tool 10 used with the spring 36 on the outer side of the brake shoe and FIG. 7 shows the tool 10 used with a spring 36 on the inner side of the brake shoe 32. The tool 10 is disposed in opposite directions in FIGS. 6 and 7 because of the location of the spring 36 and the access available. The dust shield 38 in FIG. 6 severely restricts access to the spring 36 on the inner side of the brake shoe 32 and without the tool 10 of the present invention, removal of the spring 36 is extremely difficult. FIG. 7 more clearly shows the leverage which is obtained with the tool 10 of the present invention.

Figure 11:
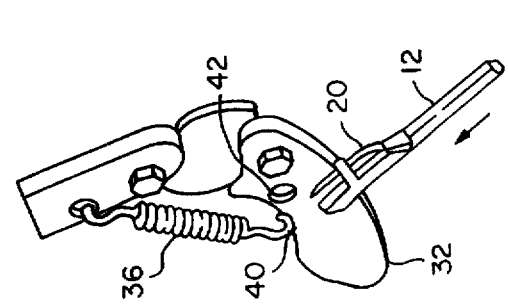
FIG. 11 is a perspective view showing the tool being moved away from the spring which has been installed on the brake shoe.
Figure 12:
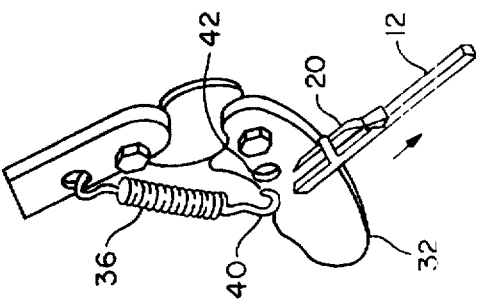
FIG. 12 is a perspective view showing the tool being moved toward the spring installed on the brake shoe in order to remove the spring.
Figure 13:
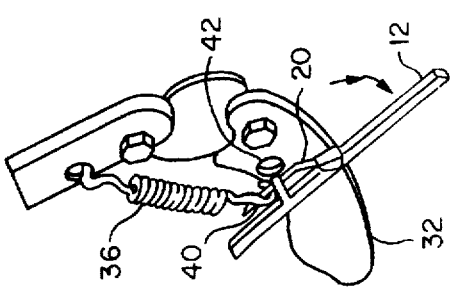
FIG. 13 is a perspective view showing the spike engaging the arcuate end of the spring while it is connected to the brake shoe.
Figure 14:
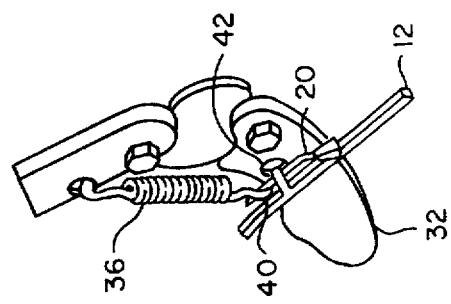
FIG. 14 is a perspective view showing the tool being leveraged downwardly to expand the spring and being moved away from the brake shoe to remove the end of the spring from the opening in the brake shoe.
Figure 15:
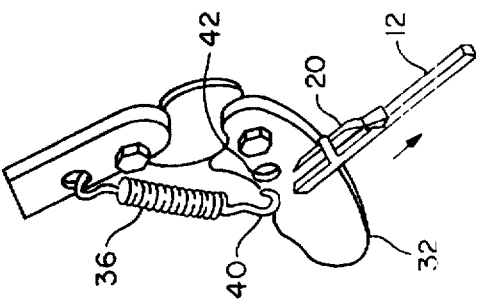
FIG. 15 is a perspective view showing the tool being withdrawn from the spring which has been removed from the brake shoe.

FIGS. 8–11 are a sequence showing the installation of the spring 36 on a brake shoe 32. In this sequence, it is understood (and not shown) that the second end 16 of the shaft 12 is leveraged against the axle 34. The shaft 12 is moved toward the spring 36 such that the tapered first end 26 of the spike 20 is received in an arcuate end 40 of the spring 36. Pressure is applied downwardly on the handle using leverage against the axle such that the spring 36 is expanded. Because of the mechanical advantage of the length of the shaft, it is not necessary to apply great pressure on the handle. When the spring 36 has expanded sufficiently for the end of the spring 36 to be opposite an opening 42 in the brake shoe 32, the tool 10 is moved toward the brake shoe 32 (see arrows in FIG. 10) and the end of the spring 36 is installed in the opening 42. Due to the arcuate nature of the end of the spring 36, there is clearance for the spike 20 to move between the brake shoe 32 and the arcuate end 40 of the spring 36. Thus, as shown in FIG. 11, the shaft 12 is easily withdrawn from the brake shoe and installation of the brake spring 36 has been accomplished rapidly and safely.

FIGS. 12–15 are the reverse of FIGS. 8–11 and show the removal of the brake spring 36. The tool 10 is inserted into the vehicle with the second end 16 of the shaft 12 leveraged against the axle 34. The spike 20 is slid between the brake shoes 32 and the arcuate end 40 of the spring 36. Downward pressure is applied to the tool to expand the spring 36 and the shaft 12 is moved outwardly from the brake shoe 32 to remove the arcuate end 40 of the spring 36 from the opening 42 in the brake shoe 32 (see arrows in FIG. 14). Pressure on the shaft is released and the shaft is withdrawn from the vehicle. The spring 36 has been rapidly and safely removed form the brake shoe 32.

Thus, it can be seen that the tool 10 is very simple and can be produced with minimum cost. The tool requires virtually no training to be used.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A tool for installing and removing a spring for brake shoes on an axle of a truck or large vehicle, the tool comprising:

a shaft having a first end and an opposite second end, a handle connected to the first end of the shaft, a spike mounted on the shaft, the spike being spaced apart from and approximately parallel to the shaft, wherein the spike engages an arcuate end of the spring, the second end of the shaft being leveraged against the axle to expand the spring such that the spring may engage or disengage brake shoe, wherein the handle is angularly connected to the first end of the shaft, and wherein the angle is approximately 35°.

2. The tool of claim 1, wherein the spike is approximately at a midpoint of the shaft between the first and second end thereof.

3. The tool of claim 1, wherein the spike has an end oriented toward the second end of the shaft, the end of the spike being chamferred to permit engagement with the arcuate end of the spring.

4. The tool of claim 1, wherein the spike has a first end and an opposite second end, the first end of the spike being oriented toward the second end of the shaft, the second end of the spike being removably connected to the shaft.

5. The tool of claim 4, further comprising a means connected to the shaft, the means removably retaining the second end of the spike.

6. The tool of claim 1, further comprising a guide mount formed at approximately a midpoint of the shaft, the spike being received in the guide mount such that a first end of the spike is oriented toward the second end of the shaft.

7. A tool for installing and removing a spring for brake shoes on an axle of a truck or large vehicle, the tool comprising:

a shaft having a first end and an opposite second end, a handle connected to the first end of the shaft, a spike mounted on the shaft, the spike being spaced apart from and approximately parallel to the shaft, wherein the spike engages an arcuate end of the spring, the second end of the shaft being leveraged against the axle to expand the spring such that the spring may engage or disengage the brake shoe, and wherein the shaft, between the spike and the second end, has a first bend in a direction away from the spike and a second bend in a direction toward the spike, thereby providing clearance for the shaft to contact the axle of the vehicle.

8. The tool of claim 7, wherein each bend is at an angle of approximately 10°.

9. The tool of claim 7, wherein the spike is approximately at a midpoint of the shaft between the first and second end thereof.

10. The tool of claim 7, wherein the spike has an end oriented toward the second end of the shaft, the end of the spike being chamferred to permit engagement with the arcuate end of the spring.

11. The tool of claim 7, wherein the spike has a first end and an opposite second end, the first end of the spike being oriented toward the second end of the shaft, the second end of the spike being removably connected to the shaft.

12. The tool of claim 11, further comprising a means connected to the shaft, the means removably retaining the second end of the spike.

13. The tool of claim 7, further comprising a guide mount formed at approximately a midpoint of the shaft, the spike being received in the guide mount such that a first end of the spike is oriented toward the second end of the shaft.

14. A tool for installing and removing springs for brake shoes on an axle of a truck or large vehicle, the tool comprising:

a shaft having a first end and an opposite second end;

a handle angularly connected to the first end of the shaft;

a spike mounted on the shaft at approximately a midpoint thereof, the spike being spaced apart from, and approximately parallel to, the shaft;

the shaft, between the spike and the second end, having a first bend in a direction away from the spike and a second bend in a direction toward the spike;

wherein the spike engages an arcuate end of the spring, the second end of the shaft being leveraged against the axle to expand the spring such that the arcuate end of the spring may engage or disengage the brake shoe.

15. A method of using a tool for installing and removing a spring for brake shoes on an axle of a truck or large vehicle comprising the steps of:

providing a tool having a shaft with a first end and a second end, a handle being connected to the first end, a spike being mounted on the shaft, placing the tool adjacent to the brake shoe such that the spike is received in an arcuate end of the spring and the second end of the shaft is disposed under the axle, pressing downwardly on the handle to leverage the tool against the axle and expand the spring, moving the tool toward the brake shoe to install the arcuate end of the spring or moving the tool away from the brake shoe to remove the spring, and moving the tool away from the axle wherein the spike is removed from the spring and the end of the shaft is removed from the axle.

* * * * *